(12) United States Patent
Zajac et al.

(10) Patent No.: US 12,022,025 B2
(45) Date of Patent: Jun. 25, 2024

(54) CALL MANAGEMENT SYSTEM FOR INCOMING VIDEO CALLS AT A COMMAND CENTER

(71) Applicant: MOTOROLA SOLUTIONS, INC., Chicago, IL (US)

(72) Inventors: Tomasz Zajac, Ruda Slaska (PL); Szymon Sikora, Cracow (PL); Pawel Ciupek, Cracow (PL); Pawel Jurzak, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/642,007

(22) PCT Filed: Dec. 20, 2019

(86) PCT No.: PCT/PL2019/050080
§ 371 (c)(1),
(2) Date: Mar. 10, 2022

(87) PCT Pub. No.: WO2021/125984
PCT Pub. Date: Jun. 24, 2021

(65) Prior Publication Data
US 2024/0048655 A1    Feb. 8, 2024

(51) Int. Cl.
*H04M 3/51* (2006.01)
*H04L 65/1069* (2022.01)
*H04M 3/523* (2006.01)

(52) U.S. Cl.
CPC ....... *H04M 3/5116* (2013.01); *H04L 65/1069* (2013.01); *H04M 3/5232* (2013.01)

(58) Field of Classification Search
CPC .. H04M 3/5116; H04M 3/5232; H04M 11/04; H04M 2242/04; H04M 1/72424; H04M 2250/10; H04M 1/72418; H04M 3/42348; H04L 65/1069; H04W 76/50; H04W 4/029; H04W 4/02; H04W 88/06; H04W 4/90

See application file for complete search history.

(56) References Cited

U.S. PATENT DOCUMENTS

| 8,368,754 B2 | 2/2013 | Flores et al. |
| 8,762,302 B1 | 6/2014 | Spivack et al. |

(Continued)

FOREIGN PATENT DOCUMENTS

| GB | 2501338 A | 10/2013 |
| WO | 2021034206 A2 | 2/2021 |

*Primary Examiner* — Akelaw Teshale

(57) ABSTRACT

A process and system for managing incoming video emergency calls (VECs) at a command center relative to an incident includes receiving first and second VECs from respective first and second recording and transmitting devices reflecting a first incident. Identifying the second VEC as a preferred one of the first and second VECs based on one or both of a quality and a field-of-view between the first and second VECs, and responsively causing the identified second VEC to be forwarded to a first live call taker and the first VEC to a VEC monitoring bot configured to continue to monitor video content of the first VEC and refrain from forwarding the first VEC to the first live call taker. The first VEC may be forwarded to the first live call taker at a lower relative resolution.

19 Claims, 6 Drawing Sheets

(56) References Cited

U.S. PATENT DOCUMENTS

| | | |
|---|---|---|
| 10,210,869 B1 | 2/2019 | King et al. |
| 10,306,059 B1 | 5/2019 | Bondareva et al. |
| 10,348,888 B1 | 7/2019 | Arnold et al. |
| 10,708,429 B2 | 7/2020 | Firpo et al. |
| 10,715,662 B2 | 7/2020 | Bondareva et al. |
| 10,824,301 B2 | 11/2020 | Frommelt et al. |
| 2008/0037762 A1* | 2/2008 | Shaffer ............ H04M 3/42187 379/265.09 |
| 2012/0098918 A1 | 4/2012 | Murphy |
| 2017/0223302 A1 | 8/2017 | Conlan et al. |
| 2019/0379788 A1* | 12/2019 | Bondareva ............ H04L 51/214 |

* cited by examiner

CALL MANAGEMENT SYSTEM FOR INCOMING VIDEO CALLS AT A COMMAND CENTER

BACKGROUND OF THE INVENTION

Civilians, law enforcement, and other public safety and non-public safety personnel may witness or respond to incidents in the course of their daily activities. Call takers and first responders responding to such incidents often benefit from collecting as many pieces of information about the incident (for example, status of incident, status of responding public safety personnel, status of those persons involved in the incident, status of objects/vehicles involved in the incident, status of public or private thoroughfares involved in or adjacent the incident, etc.) as possible from numerous reports via phone and/or video calls. During the occurrence of one or more incidents, the number of phone and/or video calls received at a command center may increase. Emergency call takers and incident-handling dispatchers may not be able to handle and sort through content of the video calls, in particular, efficiently and, as a result, important information may be missed.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
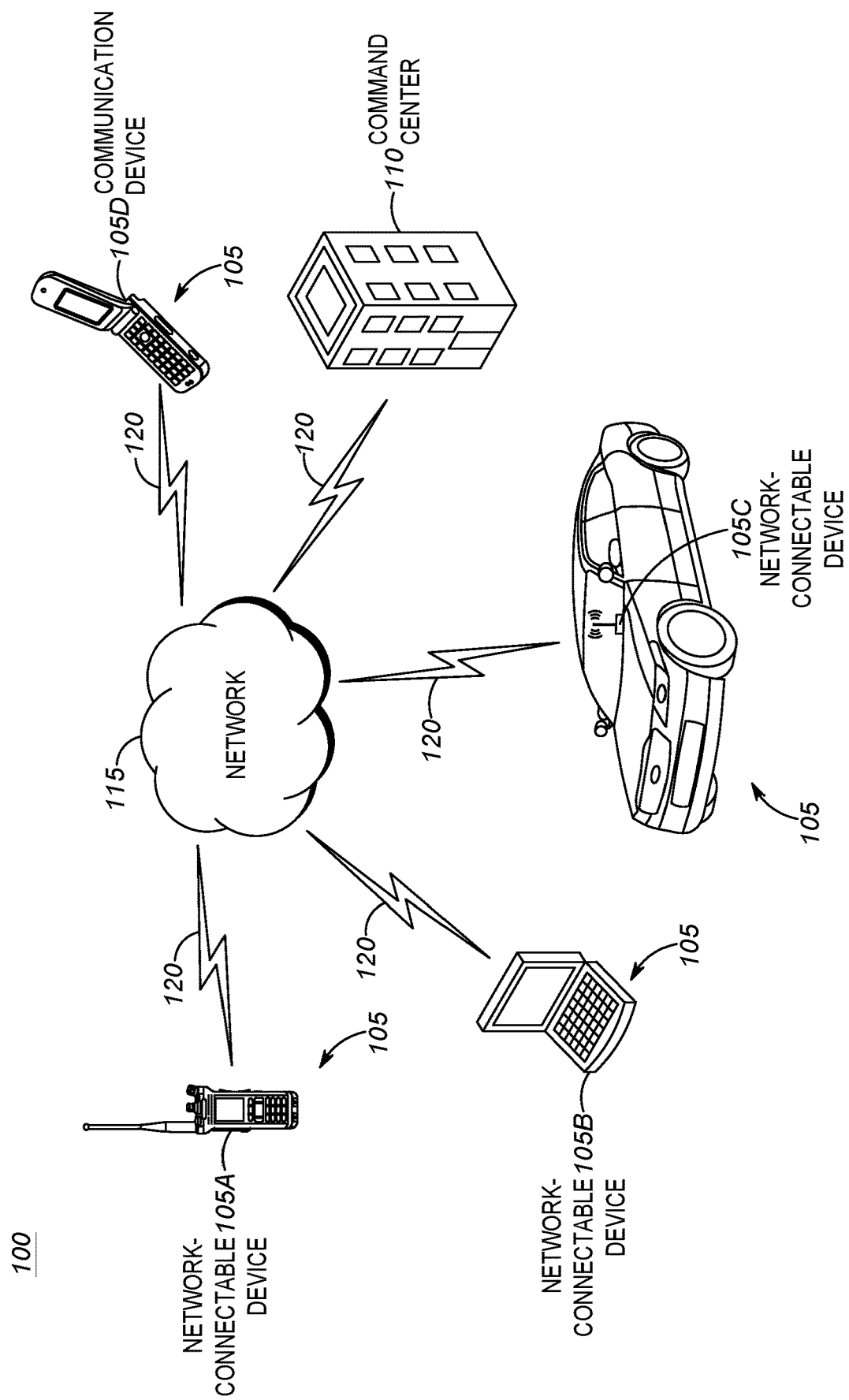
FIG. 1 is a block diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One or more devices such as tablets, laptop computers, desktop computers, telephones (for example, cellular, landline, or satellite), devices with an interactive display, and other communication devices may be a part of a console (also referred to herein as a workstation) operated by an emergency call taker or incident handling dispatcher (hereinafter referred to as a call taker). In some embodiments, the workstation of a call taker presents one or more received video emergency calls to the call taker via an output device. For example, visual content of a video call may be displayed via a computer monitor output portion of the workstation while audio content of the video may be output via a speaker of the workstation. In this and other ways, the workstation allows the call taker to participate in video calls with civilians, public safety officers, or other public safety or non-public safety personnel at or near an incident, and to receive audio and/or video information regarding the incident, allowing the call taker to become more informed about the incident, record information about the incident, and/or selectively provide portions of such information to en-route and/or on-scene public safety personnel responding to the incident.

In some situations, the number of video emergency calls routed to a particular call taker or dispatcher (call taker) at a command center or public safety answering point (PSAP) may make it difficult for the particular call taker to address all callers behind the video emergency calls, and/or difficult for the particular call taker to determine which particular one of the video emergency calls would provide the particular call taker with the most informative view of the incident in general, or most informative view of the incident relative to a particular context of the call taker such as a question being asked by the call taker himself or herself or being asked of the call taker by a responding officer (en-route to the incident or on-scene), or such as a particular instruction to perform an action for which the call taker will communicate to one of the particular call takers when multiple are available. This is especially true for large incidents in which the quantity of video emergency calls currently or in the near future may reach into the double (e.g., 10-99) or triple digits (e.g., 100-500). As a result, the call taker may be unable to handle all of the video emergency calls received and some pending (in other words, ringing or active) video emergency calls may be placed in a call queue to be handled or returned to later. This situation may disadvantageously result in some video emergency callers hanging-up or otherwise ending the transmitting of video content in their video emergency call, potentially resulting in a loss of information to the particular call taker and/or for the particular incident.

Accordingly, there is a need for a system that manages incoming video emergency calls relating to an incident, and determines which particular one of the incoming video emergency calls is a preferred one for the incident for the assigned call taker and/or relatively best addresses a pending question or instruction at the call taker, and that subsequently prioritizes that determined preferred video emergency call to the call taker but continues to monitor the remaining video emergency calls for changes in video emergency call content or quality, or for changes in call taker context that would change the identification of which incoming video emergency call is preferred for the incident for the assigned call taker(s).

In one embodiment a system for managing a plurality of incoming video calls at a command center relative to an incident includes an electronic computing device having an electronic processor configured to: receive a first video emergency call from a first recording and transmitting device reflecting a first incident at a first location; receive a second video emergency call from a second recording and transmitting device reflecting the first incident at the first location; identify the second video emergency call as a preferred one of the first and second video emergency calls based on one or both of a quality and a field-of-view between the first and second video emergency calls; and responsive to identifying the second video emergency call as the preferred one of the first and second video emergency calls, one of: cause the identified second video emergency call to be forwarded to a first live call taker at a call taking position and cause the first video emergency call to be forwarded to a video emergency call monitoring bot configured to continue to monitor video content of the first emergency call and refrain from forwarding the first video emergency call to the first live call taker; and cause the identified second video emergency call to be forwarded to the first live call taker at the call taking position at a first higher relative resolution and cause the first video emergency call to be forwarded to a video emergency call monitoring bot configured to continue to monitor video content of the first emergency call and cause the identified first video emergency call to be forwarded to the first live call taker at the call taking position at a second lower relative resolution.

In a further embodiment, a method for managing a plurality of incoming video calls at a command center relative to an incident includes: receiving, at an electronic computing device, a first video emergency call from a first recording and transmitting device reflecting a first incident at a first location; receiving, at the electronic computing device, a second video emergency call from a second recording and transmitting device reflecting the first incident at the first location; identifying, by the electronic computing device, the second video emergency call as a preferred one of the first and second video emergency calls based on one or both of a quality and a field-of-view between the first and second video emergency calls; and responsive to identifying the second video emergency call as the preferred one of the first and second video emergency calls, one of: cause, by the electronic computing device, the identified second video emergency call to be forwarded to a first live call taker at a call taking position and cause the first video emergency call to be forwarded to a video emergency call monitoring bot configured to continue to monitor video content of the first emergency call and refrain from forwarding the first video emergency call to the first live call taker; and cause, by the electronic computing device, the identified second video emergency call to be forwarded to the first live call taker at the call taking position at a first higher relative resolution and cause the first video emergency call to be forwarded to a video emergency call monitoring bot configured to continue to monitor video content of the first emergency call and cause the identified first video emergency call to be forwarded to the first live call taker at the call taking position at a second lower relative resolution.

Examples disclosed herein are described in terms of public safety and emergency personnel. However, it should be understood that the systems, methods, and devices described herein are not limited to the public safety environment and may be applied to other types of communication centers, for example, a customer service center or an enterprise security and/or safety communication center.

1. Communication System and Device Architecture

FIG. 1 is a block diagram of a communication system 100 according to one example embodiment. The communication system 100 includes various communication devices 105A through 105D communicatively coupled to a command center 110 via a network 115. In the following description, when explaining how a single communication device functions, a reference to communication device 105 is used. As indicated by FIG. 1, the communication device 105 may be any one of a number of different types of communication devices having a transmitting capability (e.g., wireless and/or wired transmission capability) and a video recording capability (e.g., via a visual-wavelength, infrared, or other wavelength imager for generating images and/or video) such that recorded video of an incident may be transmitted to the command center 110 and may thus be alternatively referred to herein as recording and transmitting devices (RaTDs).

For example, the communication device 105 may be one or more of a smart telephone, a portable radio, a desktop or laptop computer, a tablet, a body wearable camera, or similar device. The communication device 105 may be configured to receive input from a user, for example, via a keyboard, a touchscreen display, a microphone (for example, voice commands), and the like. The types of communication devices 105A through 105D described above and shown in FIG. 1 are merely examples. In other embodiments, the communication system 100 includes other types of communication devices. In some embodiments, the communication system 100 includes more or fewer communication devices 105 than the number of communication devices 105 shown in FIG. 1.

As shown in FIG. 1, the communication system 100 also includes a command center 110. For example, the command center 110 is a security management office at a theme park or a public safety command center such as a police headquarters, fire station, dispatch center, public safety answering point (PSAP), operations center, command and control facility, and the like. The command center 110 includes a monitoring computer 205 (e.g., on which one or more video emergency call monitoring programs (or bots) may be deployed) and one or more workstations 210 (e.g., at one or more call-taker positions manned by respective call takers) that are part of the communication system 100 as will be further explained below with respect to FIG. 2. In the following description, when explaining communication to or from the command center 110, it should be understood that such communication is occurring to or from one or more of the monitoring computer 205 and the workstations 210 included in the command center 110.

As indicated in FIG. 1, the communication devices 105A through 105D and the command center 110 may communicate with each other over a network 115 over respective wireless links 120 and via corresponding network interfaces including, for example, one or more transceiver circuits. The network 115 may include wireless and/or wired portions. All or parts of the network 115 may be implemented using various existing networks, for example, a cellular network including an Long Term Evolution (LTE) network, a 5G network (including a network architecture compliant with, for example, the 3GPP TS 23 specification series and a new radio (NR) air interface compliant with the 3GPP TS 38 specification series) standard, a packet switched network such as the Internet, and Ethernet network, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 115 may also include future developed networks. In some embodiments, the network 115 may include a combination of two or more of the networks mentioned.

Figure 2:
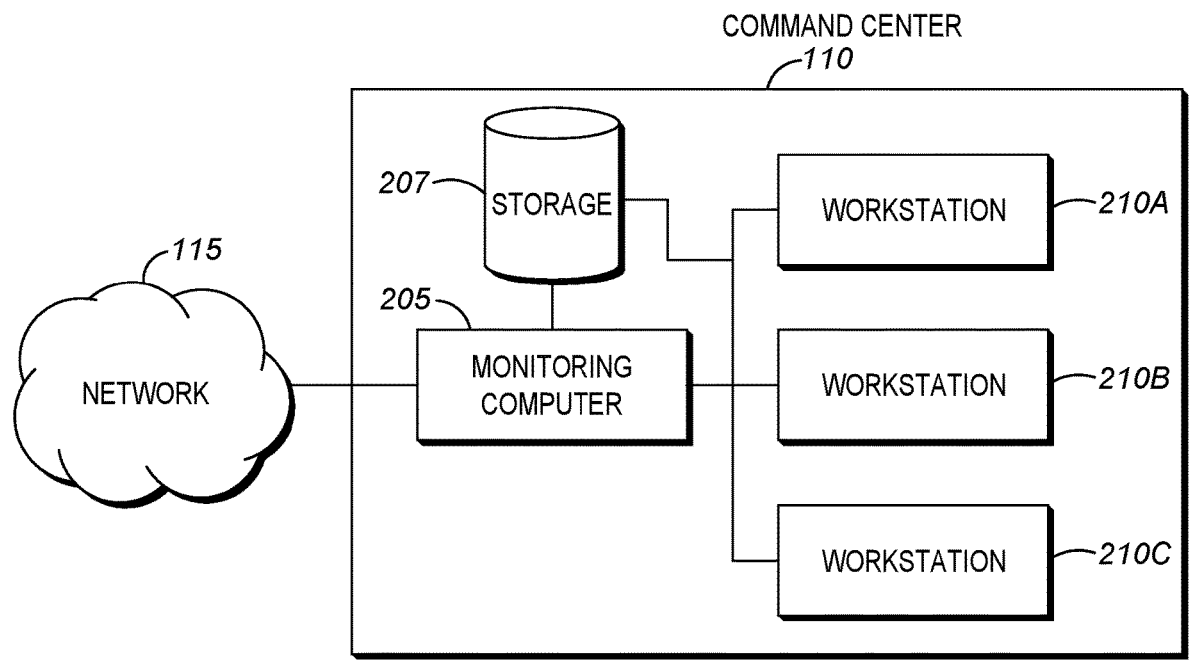
FIG. 2 is a block diagram of a command center included in the communication system of FIG. 1 according to one example embodiment.

FIG. 2 is a block diagram of the command center 110 according to one example embodiment. The command center 110 includes a monitoring computer 205 and a plurality of call handling workstations 210A through 210C and each associated with a different call-taker position. In the following description, when explaining how a single workstation functions, a reference to workstation 210 is used. The workstations 210 may be consoles that are each operated by a separate call taker (for example, public safety dispatch consoles each operated by a separate public safety call taker or dispatcher, or other public safety personnel). In some situations, the call takers include both emergency call-takers (e.g., personnel that may regularly interface with civilians calling over privately owned phone networks) and incident-handling dispatchers (.e.g, personnel that may regularly interface with public safety personnel using publically owned radio networks). In some embodiments, an emergency call-taker is a person who analyzes a received data feed (for example, voice call, live or recorded video feed including a video emergency call, text message, and the like), identifies an incident based on the data feed, and decides how to respond to the data feed to help the person (or to help other public safety personnel) handle or respond to the incident. For example, the emergency call-taker may transfer the data feed to a different agency (for example, animal control), take no action or hand off the data feed to a monitoring bot (for example, when the data feed is a substantially duplicate feed or a lower quality feed or less impactful (based on context of the incident and/or call taker) feed), transfer the data feed to the workstation of another call-taker (for example, the incident-handling dispatcher), and the like. A workstation may receive one or more data feeds from multiple sources including, for example, communication devices 105 operated by citizens or first responders/public safety personnel.

In some situations, a particular call taker and/or dispatcher may be temporarily assigned to a particular incident to which officers are being dispatched, is being supervised, is already providing on-scene assistance, and the like (for example, a concert, a sporting event, an accident, a fire, a reported burglary event, etc.). In some embodiments, the monitoring computer 205 is communicatively coupled to the network 115 and to the workstations 210A through 210C via wired connections, wireless connections, or a combination thereof.

As explained in greater detail below, the monitoring computer 205 is configured to receive one or more data feeds (for example, video emergency calls) from one or more communication devices 105 over the network 115. In some embodiments, the monitoring computer 205 is configured to control which received data feeds are provided to which workstations 210, at what resolutions/quality, and/or which received data feeds are continuously monitored but not provided to any workstations 210 or provided at relatively lower quality (resolutions, frame rates, etc.). Likewise, the workstations 210 are configured to communicate through the monitoring computer 205, or directly, to one or more communication devices 105 over the network 115. For ease of description, data feeds received at the monitoring computer 205 that are then directed to the one or more workstations 210 are herein referred to as "forwarded calls." It should be understood that, while the video emergency calls are generally described as being muxed audio/video feeds (multimedia calls) in the examples described herein, video emergency calls may additionally or alternatively include only video (e.g., no audio) or may include selectable streams between captured audio and/or video and metadata generated at the edge device (e.g., communication devices 105) describing objects and/or actions occurring in the captured audio and/or video, among other possibilities.

The monitoring computer 205, described more particularly below with respect to FIG. 3, may be implemented as a stand-alone device (for example, an on-premises server) or distributed across one or more electronic processing devices (for example the workstations 210A through 210C). In some embodiments, the monitoring computer 205 may additionally or alternatively be implemented as a cloud-based server/application (for example, operating on one or more virtual servers) accessible via network 115.

The workstation 210 is used by a call taker, and in one example, may be a public safety dispatch console used by an incident-handling dispatcher as explained above. The workstation 210 is configured to send and receive data to and from the monitoring computer 205 (via the communications network 115) and/or to and from communication devices 105, via the monitoring computer 205. As indicated by FIG. 1, the workstation 210 may be configured to directly or indirectly communicate with one or more communication devices 105. The workstation 210 may receive captured images, video, audio such as voice calls, video emergency calls, and other data feeds related to incidents indirectly through the monitoring computer 205 or directly over the communication network 115 (via a path bypassing monitoring computer 205). Although the workstations 210 are described as being located at the command center 110, in some embodiments, one or more of the workstations 210 are located/dispersed outside the command center 110, for example, when one or more of the workstations 210 are located at a different command center and/or are portable devices such as the communication devices 105 described above. In some embodiments, the command center 110 includes more or fewer workstations 210 than the number of workstations 210 shown in FIG. 2.

As mentioned above, the monitoring computer 205 may receive and may be involved in allocating calls, including video emergency calls, received from one or more communication devices 105 to one or more of the workstations 210. In some embodiments, for each call received at the monitoring computer 205, a call record is created. Each call record includes information regarding the call, for example, a telephone number that the call is from, a timestamp of when the call was first received, a caller identification identifying a user of the communication device that originates the call, a location of the communication device that the call is from, a location of a cell tower that was used to transmit the call when the call is a wireless call, and the like.

Additional information included in the call record may be obtained by analyzing the one or more data feeds and/or metadata included in the call or included prior to the call (e.g., in a header transmitted prior to the content of the call). The analysis may be performed while the call is in a queue at the monitoring computer and/or when the call is being handled by a call taker at a workstation 210.

As a first example, the monitoring computer 205 may apply an object-recognition algorithm having access to a database of known objects to the received data feeds that include video (such as video emergency calls) and identify one or more objects that match known object(s) from the object recognition database. Various image processing algorithms may be used to match objects in the data feeds received to known objects, including but not limited to geometric hashing, edge detection, scale-invariant feature transform (SIFT), speeded-up robust features (SURF), neural networks, deep learning, genetic, gradient-based and derivative-based matching approaches, Viola-Jones algorithm, template matching, or image segmentation and blob analysis. Other possibilities exist as well. Once an object is matched, metadata describing the object from the object recognition database (e.g., identifying the object as a person, a vehicle, a building, a tool, an animal, a sign, an event, a vehicle, or some other type of object) may be embedded and stored within the call record, or may be stored in a separate data feed metadata file and stored accompanying the data feed video stream (and both associated with the call and/or caller or with an incident record as will be described later). Additional metadata regarding the identified object may be identified and/or extracted from the data feed audio/video stream or other sources (such as audio) and stored as well, including but not limited to a color of the object, a time (point in time or a time window in which it is partially (25% or less) or mostly (50%-90%) or entirely (100%) visible) during which the object appeared in the data feed, a location at which the object was detected (perhaps received via a location-determination device integrated with the electronic computing device or communicably coupled to the electronic computing device, or determined via video analytics of surrounding objects such as street signs), or some other contextual information. Still further, and in some embodiments, device and/or video capture characteristics of the communication device 105 providing the data feed may be calculated from the video in the data feed itself, including but not limited to resolution, field-of-view, frame rate, etc., and similarly stored.

As a further example, a call (or header) may include metadata that indicates a location from where the call was received, a timestamp including a time at which the call was captured or transmitted, an identifier that identifies a user of the communication device 105 that is transmitting the call, an identifier used to identify device characteristics and/or video capture characteristics of the communication device 105 (such as resolution, field-of-view, aperture, frame rate, etc.), same or similar device and/or video capture characteristics specified directly, and the like. As another example, and as explained below, the monitoring computer 205 may receive information through an automated questionnaire provided (described below as part of an automated call handling process/handler) to a user of the communication device 105 or to the communication device 105 itself providing the data feed (e.g., the video emergency call in this case). In response to the automated questionnaire, the monitoring computer 205 may receive information about the data feed from the user of the communication device 105 providing the data feed and populates the call record. In some embodiments, the monitoring computer 205 determines additional information from the received information from the user of the communication device 105 as explained in greater detail below (for example, incident type information based on keyword data). Further information may be manually added to the call record via user input through the workstation 210 by a call taker handling the call after the monitoring computer 205 forwards the call to the call taker at one of the workstations 210.

As explained in more detail below, the call record may be associated with an incident record. The incident record includes information and details regarding a new incident or an incident handled or that is being handled by public safety responders/officers. The information in the incident record may include, for example, an incident type, a location of the incident, a timeline of the incident, and the like. The incident record includes a unique incident record identifier. The identifier is a unique label that discerns a particular incident record from other incident records (for example, an incident number that discerns a fire at 987 Lake Shore Drive from a vehicle accident at 123 Second Street). In some embodiments, the call records regarding the incident and the incident record may be integrated into a single record, while in other embodiments, information from one or more call records associated with the incident may be linked to or populated into an associated incident record, among other possibilities. Incident and/or call records may be stored at records store 207 and made accessible to workstations 210. Received video emergency calls being monitored by monitoring computer 205 may be temporarily or permanently stored at records store 207 as well. Records store 207 may be a separate storage device from workstations 210, may be a cloud storage device access via one or more networks such as network 115, or may be a distributed storage device distributed across workstations 210, among other possibilities.

The monitoring computer 205 also maintains a queue of active video emergency calls received from communication devices 105 that are intended for the command center 110 (referred to herein as a call queue) before, during, and after allocating calls to a queue for one or more of the workstations 210. The queue may include an indication of which received and active video emergency calls are currently being forwarded to a workstation 210 (and which workstation), which incident that each active video emergency call is associated with (either determined by the monitoring computer 205 or via a call taker at a workstation 210), and which video emergency calls are in a monitoring-only state in which contents of the video emergency call is continuing to be monitored by monitoring computer 205 and not being forwarded to a workstation 210 (or being forwarded to a workstation 210 at a relatively low or lower resolution or quality compared to an active video emergency all currently being forwarded to the workstation at a higher relative resolution or quality).

The received video emergency calls, when still active (in other words, calls where the caller has not hung up), may be directed to an active call queue of the one or more workstations 210 (at one of several available resolutions), or may be held at the monitoring computer 205 to determine if a status or context change requires that it be redirected to one or more workstations 210 or directed to one or more workstations 210 at a varied resolution. One or more video processing algorithms running at the monitoring computer 205 may process active video emergency calls in the queue to determine which video emergency call in the queue relating to a particular incident being handled by a particular workstation 210 (and thus by a particular call taker at the call-taker position associated with that particular workstation) is a preferred video emergency call for forwarding to the particular workstation 210, based at least on one or both of quality and field-of-view comparisons between the enqueued video emergency calls associated with the particular incident.

When a call taker is available, the monitoring computer 205 routes a new call in the active call queue that is unassociated with a pending incident (or is unknown whether it is associated with a pending incident) to a newly-available call taker at a workstation/call-taker position associated with the newly-available call taker. Subsequently received video emergency calls associated with an incident already in the active call queue may then have its contents analyzed by the one or more video processing algorithms to determine if it is more highly preferred than an existing video emergency call that is already being forwarded to a particular workstation 210 and call taker position associated with the incident, and if it is, the monitoring computer may forward the subsequently received video emergency call to the particular workstation 210 in place of or in addition to (at a higher resolution or quality than) the existing video emergency call that was being forwarded to the particular workstation 210. The existing video emergency call that was being forwarded to the particular workstation 210 may then return to only being monitored by the one or more video processing algorithms at monitoring computer 205 and not being forwarded to the particular workstation 210 or to any workstation 210.

Figure 3:
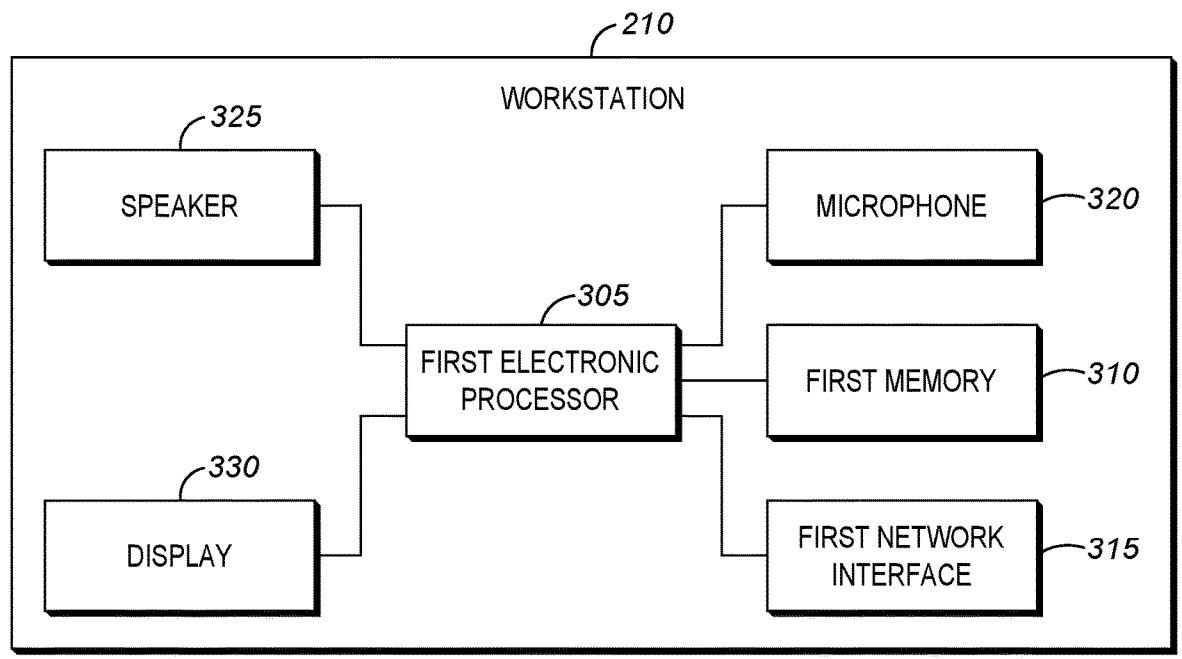
FIG. 3 is a block diagram of a workstation included in the command center of FIG. 2 according to one example embodiment.

FIG. 3 is a block diagram of a workstation 210 according to one example embodiment. In the embodiment illustrated, the workstation 210 includes a first electronic processor 305 (for example, a microprocessor or other electronic device). The first electronic processor 305 includes input and output interfaces (not shown) and is electrically coupled to a first memory 310, a first network interface 315, a microphone 320, a speaker 325, and a display 330. In some embodiments, the workstation 210 includes fewer or additional components in configurations different from that illustrated in FIG. 3. For example, the workstation 210 may additionally include a push-to-talk button and/or a camera, either or both of which may be used to allow the call taker/dispatcher to participate in one of the video emergency calls forwarded to the workstation 210 by monitoring computer 205. As another example, the workstation 210 may include one or more additional input devices such as a computer mouse and/or a keyboard that receive inputs from a user of the workstation 210. In some embodiments, the workstation 210 performs functionality in addition to or other than the functionality described below.

The first memory 310 may include read only memory (ROM), random access memory (RAM), other non-transitory computer-readable media, or a combination thereof. The first electronic processor 305 is configured to receive instructions and data from the first memory 310 and execute, among other things, the instructions. In particular, the first electronic processor 305 executes instructions stored in the first memory 310 to perform the methods described herein, including but not limited to the workstation operations described with respect to FIG. 5 and its associated text. In some embodiments, the first memory 310 is implemented on devices located at the command center 110, at a remote location, and/or at a remote cloud-computing cluster.

The first network interface 315 electronically sends and receives data to and from the monitoring computer 205. In some embodiments, the first network interface 315 additionally or alternatively sends and receives data to and from the network 115 without the data first passing through the separate monitoring computer 205. In some embodiments, the first network interface 315 includes one or more transceivers for wirelessly communicating with the monitoring computer 205 and/or the network 115. Alternatively or in addition, the first network interface 315 may include a connector or port for receiving a wired connection to the monitoring computer 205 and/or the network 115, such as an Ethernet cable. The first electronic processor 305 may receive one or more data feeds (for example, an video emergency call, an audio feed, an image feed, a text feed, a sensor input data feed, and the like) over the network 115 through the first network interface 315 (for example, data feeds generated by one or more communication devices 105 and transmitted over the network 115). In some embodiments, the first electronic processor 305 receives data through the first network interface 315 directly from a communication device 105. In some embodiments, communication of data feeds may occur in approximately real-time. The first electronic processor 305 may communicate data generated by the workstation 210 over the network 115 through the first network interface 315, such as for receipt by one or more communication devices 105. For example, the first electronic processor 305 receives electrical signals representing sound from the microphone 320 and may communicate information relating to the electrical signals over the network 115 through the first network interface 315 to other devices, for example, to one or more communication devices 105 for reproduction. Similarly, the first electronic processor 305 may output the one or more data feeds received from the network 115 through the first network interface 315, for example from a communication device 105, through the speaker 325, the display 330, or a combination thereof. For example, the workstation 210 engages in a bidirectional (or unidirectional) video emergency call with a communication device 105 over the network 115.

The display 330 displays images, video, text, and/or data from sensor inputs to the user (for example, an incident-handling dispatcher). The display 330 may be a liquid crystal display (LCD) screen or an organic light emitting display (OLED) display screen. In some embodiments, a touch sensitive input interface may be incorporated into the display 330 as well, allowing the user to interact with content provided on the display 330. In some embodiments, the display 330 includes a projector or future-developed display technologies. In some embodiments, the speaker 325 and the display 330 are referred to as output devices that present data feeds to a user of the workstation 210 (for example, an incident-handling dispatcher). In some embodiments, the microphone 320, a computer mouse, and/or a keyboard or a touch-sensitive display are referred to as input devices that receive input from a user of the workstation 210.

In some embodiments, the communication devices 105 include same or similar components as those shown in FIG. 3 with respect to the workstation 210. In some embodiments, the communication devices 105 include fewer or additional components in configurations different from that illustrated in FIG. 3. For example, a communication device 105 may also include one or more of a push-to-talk button to initiate half or full-duplex voice communication over the network 115 (for example, an audio feed), a camera to capture a video feed and/or an image feed to be transmitted over the network 115, a transceiver to transmit and receive control signals and data feeds including video emergency calls, and a location component (for example, a global positioning system receiver) configured to determine the geographic coordinates of the location of the communication device 105. In some embodiments, the communication devices 105 transmit their respective location coordinates over the network 115 when transmitting data feeds to the command center 110 (for example, location information is stored as metadata associated with a data feed). Similarly, in some embodiments, the communication devices 105 also include a time stamp when transmitting a data feed such that the command center 110 may determine a time of capture of the data feed or a time of transmission of the data feed. In some embodiments, the communication devices 105 transmit a unique identifier of the communication device 105 (and/or recording device characteristics) over the network 115 when transmitting data feeds to the command center 110 (for example, a unique identifier is stored as metadata associated with a data feed and may include a media access layer (MAC) address). In some embodiments, the communication devices 105 transmit a text feed over the network 115 to the command center 110 (for example, a text message from a smart phone, portable radio, or the like that includes alphanumeric and/or numeric data).

Figure 4:
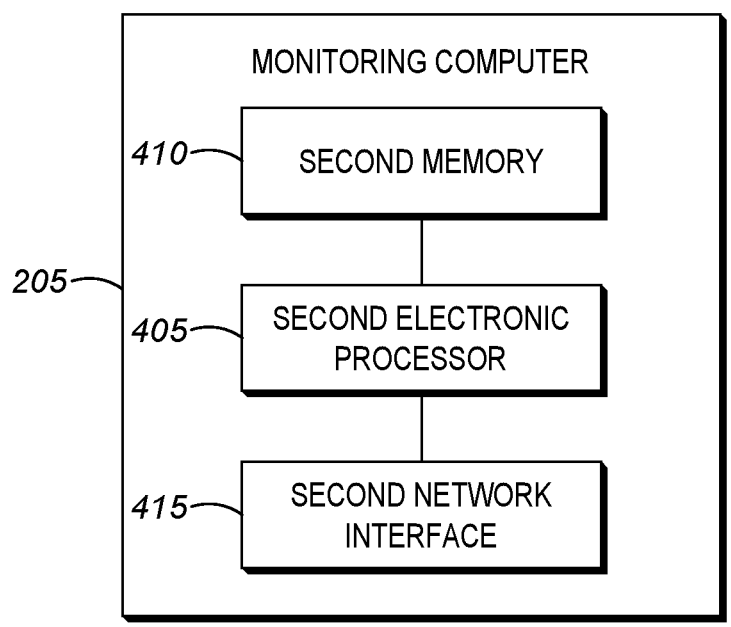
FIG. 4 is a block diagram of a monitoring computer included in the command center of FIG. 2 according to one example embodiment.

FIG. 4 is a block diagram of the monitoring computer 205 according to one example embodiment. In the example shown, the monitoring computer 205 includes a second electronic processor 405 electrically connected to a second memory 410 and a second network interface 415. These components are similar to the like-named components of the workstation 210 explained above with respect to FIG. 3 and function in a same or similar manner as described above. In some embodiments, the second network interface 415 electronically sends and receives data to and from the network 115 and the workstations 210. In some embodiments, the monitoring computer 205 includes fewer or additional components in configurations different from that illustrated in FIG. 4. For example, the monitoring computer 205 may additionally include a display such as a touch screen to allow a user to reprogram settings of the methods described below. In some embodiments, the monitoring computer 205 performs functionality other than the functionality described below.

The monitoring computer 205 is configured to receive calls from communication devices 105, maintain a call queue as described earlier, continuously monitor the calls while they remain active as described earlier, and allocate or transmit the call(s) to one or more of the workstations 210 to be handled by a call taker at a call-taker position as described earlier. In other words, the monitoring computer 205 is configured to act as one or more of a switch for calls received at the command center 110, monitor calls that are not being provided to any call taker for contextual changes that would dictate that they should be provided to a particular call taker (or provided at a higher than currently provide resolution), monitor context changes associated with a particular incident or call record and call taker(s) taking calls associated with that incident record that would dictate that a particular monitored-only call or call being provided at a lower resolution would dictate that they should be provided to a particular call taker (or provided at a higher than currently provide resolution), among other functions.

In some embodiments, monitoring computer 205 may employ a machine learning model that is trained using video emergency calls and past occurrences in monitored video emergency calls where a call taker switched from one video emergency call to another video emergency call for a particular incident type, and include video processed determined objects or events occurring in the monitored video emergency calls and metadata and context associated with call takers handling the incident, to create a trained machine learning model able to determine when monitored video emergency calls not being provided to a call taker (or being provided at a lower relative resolution) should newly be provided to the call taker (or be provided at a higher relative resolution) for particular monitored incident types. In the case neural network machine learning models, the machine learning neural networks operating at monitoring computer 205 may be one of convolutional neural networks and recurrent neural networks. Example convolutional neural network algorithms used at monitoring computer 205 may include AlexNet, ResNet, or GoogLeNet, among other possibilities. Example recurrent neural network algorithms used at monitoring computer 205 may include a Hopfield bidirectional associative memory network, a long short-term memory network, or a recurrent multilayer perceptron network, among other possibilities.

In some embodiments, data feeds are received from communication devices 105 that include, for example, sensors and a camera, that are not operated by a citizen or an officer. For example, data feeds may be received from one or more of a security camera, a traffic camera, an automated teller machine (ATM), an alarm notification system that monitors one or more of a building, a park, a fence, a parking lot, and other geographical locations (for example, a fire alarm, a toxic gas alarm, and the like), and the like.

While FIGS. 3 and 4 show separate block diagrams of the workstation 210 and the monitoring computer 205, as noted above, in some embodiments, the workstations 210 are integrated into the monitoring computer 205 and directly controlled by one or more electronic processors of the monitoring computer 205. In other embodiments, the functionality of the monitoring computer 205 may be integrated into each of the workstations 210 and/or the emergency call-taking devices. In some embodiments, the monitoring computer 205, the workstations 210, and/or a combination thereof are referred to as an electronic computing device that performs the functionality described below. For example, the electronic computing device may be a single electronic processor (for example, the second electronic processor 405 of the monitoring computer 205) or a plurality of electronic processors located in the monitoring computer 205. In other embodiments, the electronic computing device includes multiple electronic processors distributed across different devices. For example, the electronic computing device is implemented on one or more of the first electronic processors 305 of the workstations 210, the second electronic processor 405 of the monitoring computer 205, and one or more electronic processors located in one or more devices located at the command center 110, at a remote location, or at a remote cloud-computing cluster. In some embodiments, the electronic computing device is a communication device 105 and an electronic processor of the communication device 105 performs the functionality described below.

2. Process for Managing a Plurality of Video Emergency Calls Relative to an Incident As noted earlier, there is a technological problem in that in some situations, the number of video emergency calls routed to a particular call taker or dispatcher (call taker) at a command center or public safety answering point may make it difficult for the particular call taker to address (e.g., interact with) all callers behind the video emergency calls, and difficult for the particular call taker to determine a preferred one of the video emergency calls would provide the particular call taker with the most informative view (based on one or both of quality of field-of-view) of the incident, or most informative view of the incident relative to a context of the call taker such as a particular question being asked by the call taker himself or herself or being asked of the call taker by a responding officer (en-route to the incident or on-scene) or relative to a particular instruction to perform an action for which the call taker will communicate to one of the particular call takers when multiple are available. This is especially true for large incidents in which the quantity of video emergency calls currently or in the near future may reach into the double or triple digits. As a result, the particular call taker may be unable to handle all of the video emergency calls received and some pending (in other words, ringing or active) video emergency calls may be placed in a call queue to be handled or returned to later. This situation may disadvantageously result in some video emergency callers hanging-up or otherwise ending the transmitting of video content in their video emergency call and result in the loss of information available to call takers.

Accordingly, there is a technological need for a system that manages incoming video emergency calls relating to an incident, and determines which particular one of the incoming video emergency calls is a preferred one for the incident for the assigned call taker and/or relatively best addresses a pending question or instruction at the call taker, and that subsequently prioritizes that determined preferred video emergency call to the call taker but continues to monitor the remaining video emergency calls for changes in video emergency call content or quality, or for changes in call taker context that would change the identification of which incoming video emergency call is preferred for the incident for the assigned call taker(s). To address this technological problem, the electronic monitoring computer device described above performs, in one instance, one or more of the blocks explained below.

Figure 5:
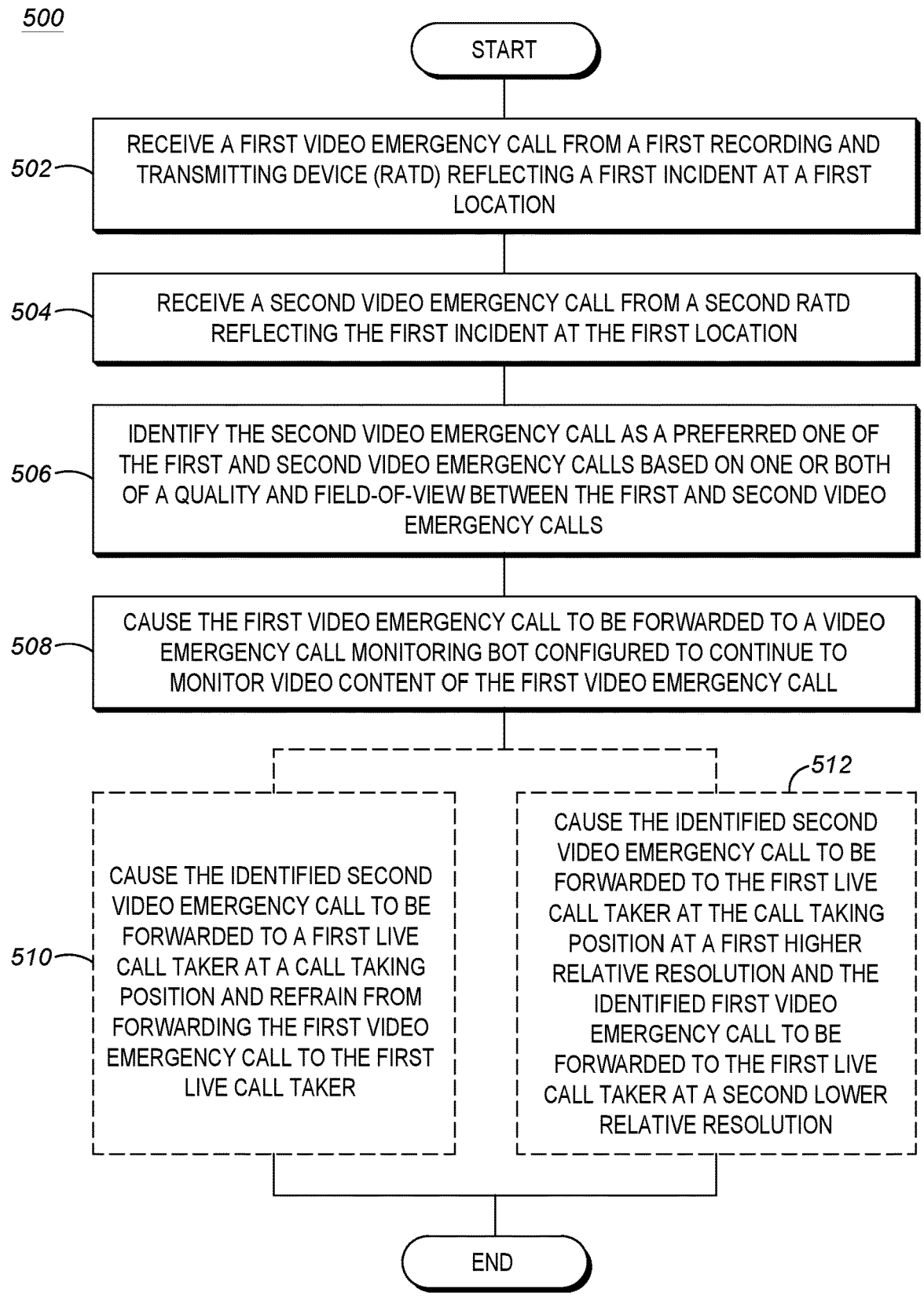
FIG. 5 is a flow chart of a method for optimizing a call queue of the command center of the communication system of FIG. 1 according to one example embodiment.

FIG. 5 illustrates a flow chart of the process 500 performed by an electronic computing device, such as monitoring computer 205, for managing a plurality of incoming video emergency calls at a command center relative to an incident, and in particular, where the number of incoming video emergency calls at a command center with respect to a particular incident is greater than the number of call takers assigned to that incident and for selectively routing video emergency calls relative to that incident.

While a particular order of processing steps, message receptions, and/or message transmissions is indicated in FIG. 5 as an example, timing and ordering of such steps, receptions, and transmissions may vary where appropriate without negating the purpose and advantages of the examples provided.

At block 502, the electronic computing device receives a first video emergency call from a first RaTD such as communication device 105 (for example, from a civilian calling about an incident). The call includes one or more data feeds (including at least a video feed) carried over a first communication channel from the first RaTD. As another example, the data feed may also include an audio feed such as ambient sounds or a voice of the first RaTD user. As mentioned above, in some embodiments, the call is an audio/video muxed feed that includes both audio and visual data in one stream. In further embodiments, the call may include a text feed (for example, one or more text messages), and the like. At the time of receipt of the first video emergency call, a call record may be created and populated in the manner set forth earlier, and an incident record may be created in the manner set forth earlier reflecting a first incident reported by the first video emergency call. Assuming that this is the first call reporting the first incident, or if it cannot be determined whether the first emergency call is reporting an incident (whether duplicative or not), the call may be forwarded to a call taker at a call taking position such as to workstation 210A.

Even as the first video emergency call is being forwarded to workstation 210A, the electronic computing device may continue to monitor contents of the data feed including video and other metadata associated therewith, and store such video and metadata at an electronic store such as electronic store 207. Metadata received (perhaps extracted) and stored at step 502 may include information associated with a quality of the first video emergency call (such as resolution and frame rate) and information associated with a field-of-view of the first video emergency call (including an angle of view measured horizontally, vertically, or diagonally and that may be calculated as 2 arctan(SensorSize/2f) where SensorSize is the size of the sensor in the imaging device and f is focal length, including a more specific field-of-view distance that may be calculated as 2 (Tan (angle of view/2)×distance to subject), including contents of the field-of-view such as a number of objects or faces detected or descriptions of identified objects or faces recognized, and/or including other field-of-view related information).

Figure 6:
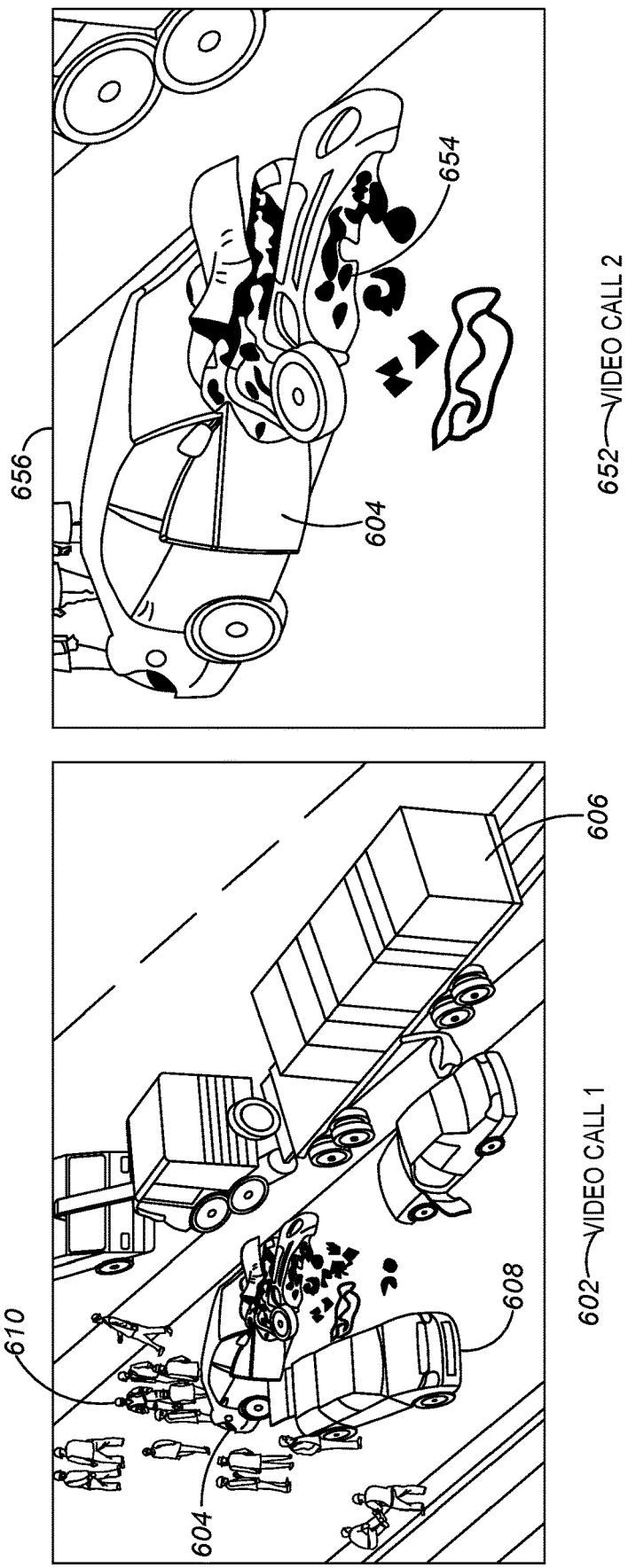
FIG. 6 is an comparison between video call content being compared at the monitoring computer of FIG. 4 according to one example embodiment.

FIG. 6 provides an illustrative example of the first video emergency call 602. In this example, metadata accompanying the first video emergency call 602 may identify the angle of view as 90 degrees for a particular recording device of the first RaTD and the field-of-view distance as 2000 m at a distance of 1000 m from the incident. The incident type may be automatically determined as a traffic accident as a result of an image analysis and/or video processing, or may be identified as a traffic accident by the call taker receiving voice and/or text information from the caller identifying it as a traffic accident, and the type of incident may be stored in the call record and/or an incident record associated with the incident. Received location information identifying a location of the caller may be similarly stored in the call record and/or incident record. A number of incident-type-related objects (here, traffic-incident-related objects) may again be automatically determined by the monitoring computer 205 applying video processing (e.g., such as video analytics or classifiers) to the incoming first video emergency call, perhaps informed by the identified incident type earlier identified by the monitoring computer 205 or by the call taker and provided back to the monitoring computer 205, or may be manually identified by the call taker, as including passenger vehicle 604, truck 606, passenger vehicle 608, and on-scene first responders 610. As shown in FIG. 6, the first video emergency call 602 may be helpful in identifying overall status and details of the traffic incident, but may not be as helpful in identifying a specific status or specific details regarding individual objects including passenger vehicle 604, truck 606, passenger vehicle 608, and on-scene first responders 610.

At block 504, the electronic computing device receives a second video emergency call 652 from a second RaTD different from the first RaTD (for example, from a second civilian calling about the incident or an on-scene responding officer). The second call includes one or more data feeds (including at least a video feed) carried over a second communication channel (same or different from the first communication channel) from the second RaTD. As another example, the data feed may also include an audio feed such as ambient sounds or a voice of the second RaTD user. Similar to that set forth above, in some embodiments, the call is an audio/video muxed feed that includes both audio and visual data in one stream. In further embodiments, the call may include a text feed (for example, one or more text messages), and the like. At the time of receipt of the second video emergency call, a second call record may be created and populated in the manner set forth earlier, and the already existing incident record may be modified in the manner set forth earlier reflecting further details about the incident included in the second video emergency call.

Assuming that this is the second or some subsequent call reporting the same first incident as the first video emergency call (as determined via the electronic computing device such as by the monitoring computer 205 in a manner set forth earlier, including but not limited to a reported location from the second RaTD being same or similar (such as within 10, 50, 100, or 200 m of the first RaTD) to the location set forth in the already created incident record for the first incident, an electronic prompt asking if the second video emergency call user is reporting the same 'traffic incident' already set forth in the incident report for the first incident (and perhaps identifying characteristics of the first incident, such as reported car makes/models included in the developing incident record), a comparison of details/objects of the video content of the second video emergency call compared to details/objects of the video content of the first video emergency call, and/or some other mechanism), the electronic computing device may refrain from immediately forwarding the second video emergency call to the call taker at the call taking position already being provided the first video emergency call (e.g., workstation 210A). Instead, the electronic computing device may add the second video emergency call to a queue of active video emergency calls relating to the identified first incident (and that already includes the first video emergency call). The first video emergency call may be marked in the queue as currently being provided to the call taker particularly assigned to the first incident (at workstation 210A as set forth above), while the second video emergency all may be marked as monitor-only. In other embodiments, the second video emergency call may be forwarded to the call taker at the workstation 210A call-taker position at a lower resolution (e.g., a quarter to a half of the resolution of the first video emergency call and/or a quarter to a half of the frame rate of the first video emergency call) compared to the first video emergency call, so that the call taker at the call taking position may still monitor a less precise or accurate representation of the second video emergency call.

On the other hand, if the monitoring computer had determined that the second video emergency call was reporting a different incident from the first incident, or if the electronic computing device could not determine whether the second video emergency call was reporting a different incident or any incident at all, the call may have been forwarded to a second call taker at an available call taking position such as at workstation 210B. Once manually identified by the second call taker as duplicative of the first video emergency call, the second call taker may then cause, via workstation 210B, the second video emergency call to be routed back to the queue for monitoring by the electronic computing device and potential forwarding to the first call taker, among other possibilities.

As the second video emergency call is continuously being monitored at the electronic computing device, the electronic computing device may continue to monitor contents of the video and other metadata associated therewith, and store such video contents and metadata at the electronic store such as electronic store 207. Metadata received (perhaps extracted) and stored at step 504 may include information associated with a quality of the second video emergency call (such as resolution and/or frame rate) and information associated with a field-of-view of the second video emergency call, including contents of the field-of-view such as a number of objects or faces detected or descriptions of identified objects or faces recognized, and/or including other field-of-view related information.

FIG. 6 provides an illustrative example of the second video emergency call 652. In this example, metadata accompanying the second video emergency call 652 may identify the angle of view as 60 degrees for a particular recording device of the second RaTD and the field-of-view distance as 11.5 m at a distance of 10 m from the incident. The incident type may be automatically determined as a traffic accident as a result of its location similarity with the first incident (e.g., within 10, 50, 100, or 200 m of the first) associated with the first video emergency call, as a result of image analysis and/or video processing, or may be identified as a traffic accident by the call taker receiving voice and/or text information from the caller identifying as a traffic accident, and the type of incident may be stored in the second call record and/or the incident record associated with the incident. Received location information identifying a location of the caller may be similarly stored in the call record and/or incident record. A number of incident-type-related objects (here, traffic-incident-related objects) may again be automatically determined by the electronic computing device (e.g., monitoring computer 205) applying video processing to the incoming second video emergency call, perhaps informed by the identified incident type earlier identified by the monitoring computer 205 or by the call taker and provided back to the monitoring computer 205, or may be manually identified by the call taker, as including passenger vehicle 604 and passenger vehicle parts 654 strewn about the road. As shown in FIG. 6, the second video emergency call 652 may be helpful in identifying specific status and details of the passenger vehicle 604, but may not be as helpful in identifying overall or general incident details such as an arrival status of first responders or number of vehicles or people involved in the incident that the first video emergency call 602 may be more helpful in identifying.

At block 506, the electronic computing device identifies the second video emergency call as a preferred one of the first and second video emergency calls based on one or both of a quality and field-of-view between the first and second video emergency calls. As noted earlier, quality information may be provided to the electronic computing device by the capture device of the RaTD (such as by one of the communication devices 105) as metadata and/or may be independently determined by the electronic computing device by video processing of the received video. Quality information such as resolution and frame rate may be used to assign an overall quality score, or a direct comparison may be made to determine which video emergency call provides a higher resolution and/or higher frame rate. As one example, a score may be calculated by multiplying the resolution in the horizontal by the resolution in the vertical and then by the frame rate, such that a video content of the first video emergency call 602 with a resolution of 720×480 at 25 fps is assigned a score of 8,640,000 while a video content of the second video emergency call 652 with a resolution of 1920×1080 at 30 fps is assigned a score of 62,208,000. Other mathematical operations such as a division operation by 10, 100, 1000, or 10,000 may be performed to lower the quality score to be more consistent with a field-of-view score.

Other parameters such as a determined dynamic range of the received video content, among other parameters, could be included in the calculation of a quality score additionally or in the alternative to one or both parameters noted above. Considering quality alone, the electronic computing device may prefer the video emergency call out of all queued video emergency calls (including perhaps the one already being provided to the call taker) having a highest calculated quality score. Some hysteresis may be provided as well to prevent temporary changes in quality from immediately causing different queued calls to be provided to the call taker assigned to the incident, such as a 5, 10, 30, or 60 s hysteresis such that quality changes alone lasting less than the hysteresis time do not cause a change in the forwarded video emergency call.

Furthermore, a comparison of field-of-view between the first and second video emergency calls may be considered in addition to or in place of quality comparisons. As noted earlier, field-of-view information may include an angle of view, field-of-view distance, and contents of the field-of-view such as a number of objects or faces detected or descriptions of identified objects or faces recognized. In general, and without further contextual information, a wider angle of view (such as the 90 degree angle of view of the first video emergency call 602) may be preferred over a more narrow angle of view (such as the 60 degree angle of view of the second video emergency call 652), a larger field-of-view distance (such as the 2000 m field-of-view distance of the first video emergency call 602) may be preferred over a shorter field-of-view distance (such as the 11.5 m field-of-view distance of the second video emergency call 652), a higher total recognized number of objects or recognized number of objects associated with the incident type of the incident (such as three in the first video emergency call 602, assuming that only one face in the group of on-scene first responders 610 is detected) may be preferred over a lower total (such as one in the second video emergency call 652), or a higher total recognized number of faces (such as one or more in the first video emergency call 602 with the same assumption as above) may be preferred over a lower total (such as zero in the second video emergency call 652). Various field-of-view components may be used instead of others or prioritized/weighted more heavily than others relative to the identified incident type.

Similar to the quality score description above, field-of-view scores may be calculated that take into account one or more, or all, of angle of view, field-of-view distance, number of objects detected (related or unrelated to the incident type of the incident), and number of faces detected. As just one example, a simple mathematic summation of the numeric representations of these numbers may be used as field-of-view scores, resulting in the first video emergency call 602 having a field-of-view score of 2094 (90+2000+3+1) and the second video emergency call 652 having a field-of-view score of 72.5 (60+11.5+1+0).

In still further embodiments, combined scores considering both quality and field-of-view may be used at the electronic computing device to identify which of the first and second video emergency calls is the preferred one. As just one example, combined field-of-view and quality scores between the first video emergency call 8,642,094 (2094+8, 640,000) and the second video emergency call 62,208,072.5 (72.5+62,208,000) may be used to identify the second video emergency call as the preferred one to forward to the call taker assigned the first incident. While, in this example, resolution scores tend to overwhelm field-of-view scores, in other embodiments, various applied multipliers and/or divisors may be applied to quality and/or field-of-view scores to even out the impact and/or provide a higher impact to field-of-view scores relative to quality scores and vice versa.

In some embodiments, additional call taker contextual information may be leveraged at the electronic computing device, perhaps provided to the electronic computing device (such as monitoring computer 205) by the call taker via the call taker's workstation or automatically by the workstation (such as by workstation 210A) or retrieved from an electronic storage (such as storage 207) by the electronic computing device on its own, among other possibilities. As noted earlier, each call taker (i.e., or dispatcher or other public safety personnel manning a call-taker position) may be periodically receiving or providing communications to other public safety personnel, such as officers en-route to the incident, officers already arrived on-scene, supervisory personnel, other agency call takers at other agencies that may also be responding to the incident, and other possible personnel. Such communications may be conducted verbally via two-way radio, cellular phones, VoIP phones, or other types of electronic communication mechanisms, such as via text, via shared entry into shared incident records, or verbally within the same room as a call taker and entered into the incident or call record by the call taker. Such verbal (translated to text at the respective workstation 210 and provided to the electronic computing device or storage 207 or by the electronic computing device after being provided with the verbal audio) or text communications (being provided directly to the electronic computing device or indirectly via shared storage 207) outside of call or incident records or inside of call or incident records associated with the incident may be monitored by the electronic computing device, and, in particular, questions posed in such communications or records may be monitored and detected by the electronic computing device. The electronic computing device may then identify one or more of the queued video emergency calls that are not being provided to the assigned call taker for the incident, or are being provided at a lower relative resolution to the particularly assigned call taker, and may use this additional information to at least temporarily identify the corresponding video emergency call as the preferred video emergency call at step 506 if it is determined to include a field-of-view including a number of or particular objects that could better answer the detected question.

As just one example, assuming the first video emergency call 602 is currently being provided to the assigned call taker for the incident, but that the electronic computing device detects an over-the-air question about the status of the passenger vehicle 604, perhaps voice-to-text converted and stored in the incident record associated with the incident and retrieved by the electronic computing device (e.g., monitoring computer 205) via storage 207, the electronic computing device may determine that the second video emergency call 652 would be better able to answer that question as it is the only object detected in the video, and may at least temporarily artificially raise the assigned combined score of the second video emergency call 652 (e.g., perhaps by raising it to a maximum value or next highest value over all current video emergency calls associated with the incident) to cause it to replace the first video emergency call 602 provided to the assigned call taker for the incident, at least until other contextual changes, other questions or instructions, or other quality changes trigger a further change (perhaps taking the hysteresis value into account).

As another example, assuming the second video emergency call 652 is currently being provided to the assigned call taker for the incident, but that the electronic computing device detects an over-the-air instruction by the call taker to the group of on-scene first responders 610 to move towards the truck 606 object, perhaps voice-to-text converted and stored in the incident record associated with the incident and retrieved by the electronic computing device (e.g., monitoring computer 205) via storage 207, the electronic computing device may determine that the first video emergency call 602 may be better able to monitor the target of the instruction and/or their progress with respect to the instruction, and may at least temporarily artificially raise the assigned combined score of the first video emergency call 602 (e.g., perhaps by raising it to a maximum value or next highest value over all current video emergency calls associated with the incident) to cause it to replace the second video emergency call 652 provided to the assigned call taker for the incident, at least until other contextual changes, other questions or instructions, or other quality changes trigger a further change (perhaps taking the hysteresis value into account).

In either or both of the above examples, the electronic computing device may automatically route the question to the corresponding preferred RaTD identified above for local playback to a user at the corresponding preferred transmitting and recording device (e.g., via display text, via speaker, or some other output mechanism), and once a response is received (again, perhaps via text or via voice) from the preferred RaTD, one or both of both provide the response to the assigned particular call taker and store the response in the associated call and/or incident records associated with the incident.

In any one of the examples noted above, the electronic computing device may, instead of automatically taking an action such as routing a detected question to a corresponding RaTD, may prompt the particular assigned call taker before taking such action (e.g., request approval before routing the identified detected question to a corresponding RaTD).

In still other embodiments, still additional call taker contextual information may be leveraged at the electronic computing device, perhaps provided to the electronic computing device (such as monitoring computer 205) by a call taker at a particular call-taker position (such as at workstation 210A) or retrieved from an electronic storage (such as storage 207) by the electronic computing device on its own. As noted earlier, each call taker (i.e., or dispatcher or other public safety personnel manning a call-taker position) may be periodically receiving or providing communications to other public safety personnel, such as other civilians at the scene, officers en-route to the incident, officers already arrived on-scene, supervisory personnel, and other possible personnel. Such communications may be conducted verbally via two-way radio, cellular phones, VoIP phones, or other types of electronic communication mechanisms such as via text, via shared entry into shared incident records, or verbally within the same room as the call taker and entered into the incident or call record by the call taker. Such verbal (translated to text at the respective workstation 210 and provided to the electronic computing device or storage 207 or translated by the electronic computing device after being provided with the verbal audio) or text communications (being provided directly to the electronic computing device or indirectly via shared storage 207) outside of call or incident records or inside of call or incident records associated with the incident may be monitored by the electronic computing device, and instructions posed in such communications or records or instructions expected to be posed based on past occurrences of similar situations or based on a machine learning model output as described earlier, may be identified by the electronic computing device.

The electronic computing device may then identify one or more of the queued video emergency calls that are not being provided to the particularly assigned call taker, or are being provided at a lower relative resolution to the particularly assigned call taker, and may use this still additional information to at least temporarily identify the corresponding video emergency call as the preferred video emergency call at step 506 if it is determined to include a field-of-view that could better monitor the target of the instruction or progress in completing the instruction.

In some embodiments, and where the electronic computing device determines that the user of the second RaTD providing second video emergency call 652 is a public safety personnel, the electronic computing device may suggest that the detected instruction be provided and/or re-directed to the user of the second RaTD. In other embodiments, and perhaps where the electronic computing device determines that the user of the second RaTD providing second video emergency call 652 is a civilian or merely in other embodiments where the device makes no such determination or determines that it is indeterminate what the status or title of the user of the second transmitting and recording device is, may use this still additional information to at least temporarily identify the corresponding video emergency call as the preferred video emergency call at step 506 for monitoring the instruction given to some public safety officer on-scene to remove a passenger from the passenger vehicle 604. Other possibilities exist as well.

At block 508, the electronic computing device causes the first video emergency call to be forwarded to a video emergency call monitoring bot configured to continue to monitor video content of the first video emergency call. In some cases, and as noted earlier, the electronic computing device having the video emergency call monitoring program (i.e., identified herein as an emergency call monitoring bot as it is generally autonomous of any human monitoring or identification as separately set forth herein as occurring at workstations/call taker positions, and generally programmed with one or more video analysis or process (including video analytics and object classifiers) to identify particular object numbers, types, etc. and/or calculate quality scores, field-of-view scores, etc., either or both perhaps as a function of the determined incident type) may already be monitoring all video emergency calls, so block 508 may merely reiterate that the first video emergency call continues to be monitored. In other embodiments, where an video emergency call being forwarded to the assigned call taker for the incident is caused to be no longer monitored/processed by the video emergency call monitoring program/bot at the electronic computing device (but may, instead, be processed at the workstation of the assigned particular call taker to which it is forwarded, and metadata and objects detected provided back to the electronic computing device for video call comparison purposes, among other possibilities), at step 508, the first emergency may again be caused to be processed/monitored by the video emergency call monitoring program/bot at the electronic computing device.

At block 510, the electronic computing device may cause the identified second video emergency call to be forwarded to the first live call taker (assigned call taker for the incident) and may refrain from forwarding the first video emergency call to the first live call taker (and, in some embodiments, any live call taker at all).

Figure 7:
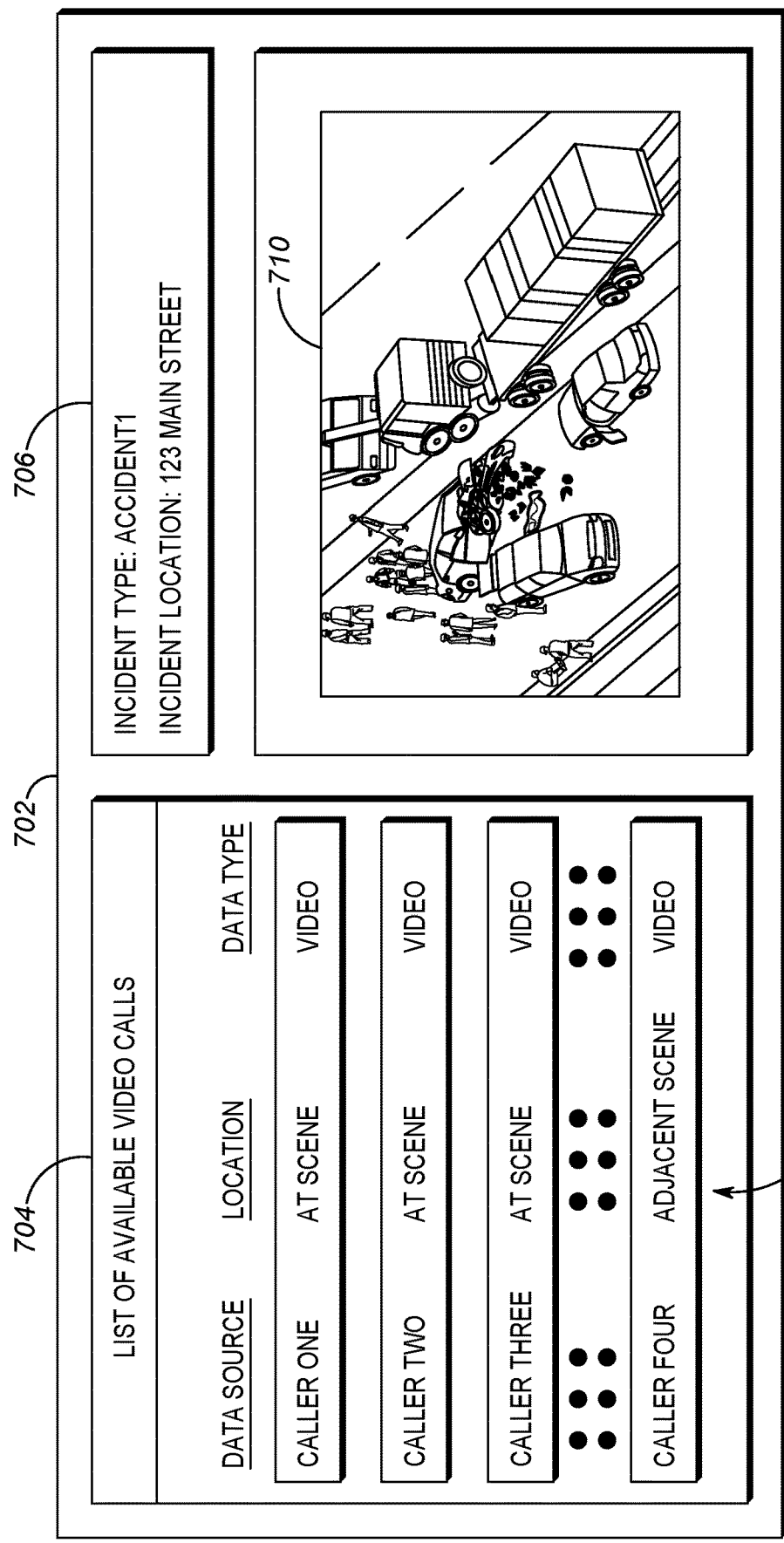
FIG. 7 is a graphical user interface of the workstation of FIG. 3 according to one example embodiment.

FIG. 7 sets forth an example user interface 702 that may be generated at a first workstation/call taker position staffed by the first live call taker, and which may include a list of active/available video emergency calls 705 determined to relate to the first incident at module 704, an incident metadata information module 706 that sets forth incident information describing the first incident with which each of the active/available video emergency calls set forth in module 704 relate, and a primary video display module 710 that displays a primary (e.g., only one of several potential emergency video calls associated with the first incident) one of the active/available video emergency calls set forth in module 704. As one example, the user interface 702 may display video call 1 602 (e.g., which may be caller one in the module 704) in the primary video display module 710 prior to steps 508 and 510 as illustrated in FIG. 7, at step 508 cause the video call 1 602 to instead or continue to be provided to the call monitoring bot at the electronic computing device for monitoring, and at step 510 refrain from providing the video call 1 602 to the first workstation/call taker position staffed by the first live call taker (and, in some embodiments, to any of the workstations/call taker positions) and instead cause the video call 2 652 to be provided to the first workstation/call taker position for display at the primary video display module 710.

At block 512, and as an alternative to block 510, the electronic computing device may cause the identified second video emergency call to be forwarded to the first live call taker at the call-taker position at a first higher relative resolution and the identified first video emergency call to be forwarded to the first live call taker at the call-taker position at a second lower relative resolution.

Returning to the example user interface 702 of FIG. 7, in some embodiments, an additional one or more of the active/available video emergency calls 705 set forth in the module 704 may be provided to the first live call taker at the first workstation/call taker position at a reduced resolution to the primary video display module 710 (not shown in FIG. 7). As one example, the user interface 702 may display video call 1 602 (e.g., which could be caller one in the module 704) in the primary video display module 710 and the video call 2 652 in a reduced resolution, smaller second video display module adjacent the primary video display module 710, prior to steps 508 and 510. At step 508, the electronic computing device may cause the video call 1 602 to instead or continue to be provided to the call monitoring bot at the electronic computing device for monitoring, and at step 512 provide the video call 2 652 at a higher relative resolution in the primary video display module 710 and the video call 1 602 in the reduced resolution, smaller second video display module adjacent the primary video display module 710. Of course, in some embodiments, any number of reduced resolution video calls may be received and displayed adjacent the primary video display module 710, including all of the video emergency calls 705 other than the video emergency call being displayed in the primary video display module 710.

Steps 504-512 may be repeated for any number of additional video emergency calls received and associated with the same first incident. For example, a third video emergency call may be received from a third RaTD reflecting the first incident at the first location. The electronic computing device may then identify the second video emergency call as a preferred one of the first, second, and third video emergency calls based on one or both of a quality and a field-of-view comparison between the first, second, and third video emergency calls, and responsively either cause the identified second video emergency call to be forwarded to the first live call taker at the call taking position and cause the first and third video emergency calls (and perhaps the second as well) to be forwarded to the video emergency call monitoring bot configured to continue to monitor video content of the first and third emergency calls and refrain from forwarding the first and third video emergency calls to the first (or any) live call taker, or cause the identified second video emergency call to be forwarded to the first live call taker at the call taking position at the first higher resolution and cause the first and third video emergency calls (and perhaps the second as well) to be forwarded to the video emergency call monitoring bot configured to continue to monitor video content of the first and third emergency calls and cause the identified first and third video emergency calls to be forwarded to the first live call taker at the call taking position at the second lower relative resolution.

Still further, steps 504-512 may be repeated for any number of detected changes in the pending active/available video emergency calls being monitored by the electronic computing device (e.g., such as those set forth in module 704).

For example, the electronic computing device may detect itself or receive an indication from the video emergency call monitoring bot (or from any one of the call taking positions/workstations for calls not being monitored by the electronic computing device) that a change in one of the quality and field-of-view of the first video emergency call has caused a priority associated with the first video emergency call to change, newly identify the first video emergency call as the preferred one of the first and second video emergency calls, and responsively either: cause the identified first video emergency call to be forwarded to the first live call taker at the call taking position and cause the second video emergency call to be forwarded to the video emergency call monitoring bot configured to continue to monitor video content of the second emergency call and refrain from forwarding the second video emergency call to the first live call taker, or cause the identified first video emergency call to be forwarded to the first live call taker at the call taking position at the first higher resolution and cause the second video emergency call to be forwarded to the video emergency call monitoring bot configured to continue to monitor video content of the second emergency call and cause the identified second video emergency call to be forwarded to the first live call taker at the call taking position at the second lower relative resolution.

The detected or indicated change in the one of the quality and field-of-view of the first video emergency call may be, as one example, a change in field-of-view from a relatively narrow view of the incident to a relatively broader view of the incident perhaps detected via an angle of view indication metadata change received from the associated RaTD in the field and perhaps due to a mechanical or electrical change at the RaTD such as a change in optical lenses. Additionally or alternatively, the detected or indicated change in the one of the quality and field-of-view of the first video emergency call may be a change in field-of-view from a relatively smaller number of incident related objects to a relatively larger number of incident related objects. As just one example, in the case of a traffic incident type, a change in the number of vehicle objects detected, a change in the number of tires detected, a change in the number of persons detected, and/or other traffic incident-type objects may cause a priority associated with the first video emergency call to change.

The detected or indicated change in the one of the quality and field-of-view of the first video emergency call may be, as still another example, a change in field-of-view from including one or more only low priority incident related objects to including one or more high priority incident related objects. As just one example, in the case of a traffic incident type, a detection of only person objects to both person and vehicle objects detected may cause a priority associated with the first video emergency call to change.

Finally, and in order to ensure that the one or more users of the one or more RaTDs providing the video emergency calls 705, for example listed in the module 704, to continue to provide video content despite the fact that they may not be directly speaking with the first live call taker at the first workstation, and in some embodiments, when the electronic computing device determines that a particular one of the video emergency calls is not the preferred one, it may cause to be transmitted to the particular one of the non-preferred video emergency calls one (or both) of an audio and visual message in the respective video emergency call to one of a user of the first RaTD and the first RaTD (itself) requesting that the first RaTD continue providing video content in the video emergency call for further monitoring by the electronic computing device and/or video emergency call monitoring bot. Accordingly, the audio and/or video message may be caused to be provided at step 506 by the electronic computing device when the particular video emergency call is identified as a non-preferred video emergency call, or may be caused to be provided at step 508 when the video emergency call is again provided (or continued to be provided only to) the video emergency call monitoring bot at the electronic computing device. The audio and/or visual message may also include an admonition to ensure that the user stay a safe distance away from the incident, and based on a type of the incident, may provide a suggest safe distance to capture video (e.g., 25 m for a traffic incident, 50 m for a building fire, 500 m for a hazardous substance incident, etc.).

In other embodiments, the electronic computing device may periodically (e.g., every 30, 60, 90, 120, or 300 s) cause to be transmitted to each non-preferred video emergency call one of an audio and visual message in the respective video emergency call to one of a user of the r RaTD and the RaTD (itself) requesting that the RaTD continue providing video content in the video emergency call for further monitoring by the electronic computing device and/or video emergency call monitoring bot.

As one example, the audio and/or visual message may be a pre-recorded electronically stored audio for playback at a speaker of the RaTD that audibly states, when played back, "Your video stream is important to us, please continue to provide a stream of the incident as it occurs, but keep yourself a safe distance from the incident as reasonably necessary." Additionally or alternatively, the electronically stored audio and/or visual message may be a text message for display on a screen of the RaTD that similarly states "Your video stream is important to us, please continue to provide a stream of the incident as it occurs, but keep yourself a safe distance from the incident as reasonably necessary." In some cases, the electronic computing device may be configured to call-back any RaTDs that disconnect, and request (via a same or similar audio or text message as set forth above provided in a similar manner to that set forth above) that they again start providing a video stream of their view of the incident.

In a still further embodiment, and in a similar instance where the electronic computing device determines that a particular one of the video emergency calls is not the preferred one, the electronic computing device may cause to be transmitted to the particular one of the non-preferred video emergency calls an instruction to reduce a capture and/or transmission quality of captured video in order to reduce a bandwidth consumption by non-preferred video emergency calls. There is clearly a balance to be struck between bandwidth consumption and an ability to continue to monitor the non-preferred video emergency calls for changes in context, and thus the request may include a requested decrease (e.g., in resolution, frame rate, etc.) or a requested decrease in bandwidth consumption (e.g., in bits/s or similar measure) that decreases bandwidth consumption but still enables the electronic computing device to detect objects of interest and/or other changes in field-of-view that would cause one of the non-preferred video emergency calls to be elevated to a preferred video emergency call. In some embodiments, the one (or both) of the audio and visual message requesting that the first RaTD continue providing video content in the video emergency call for further monitoring by the electronic computing device and/or video emergency call monitoring bot may also include an instruction to reduce recording or transmission quality to decrease bandwidth consumption, while in other embodiments, such messages or instructions may be separate and independent. Other possibilities exist as well.

In accordance with the foregoing, a system is provided that manages incoming video emergency calls relating to an incident, and determines which particular one of the incoming video emergency calls provides a preferred view of the incident for a call taker or relatively best addresses a pending question or instruction at the call taker, and that subsequently prioritizes that particular video emergency call to the call taker but continues to monitor the remaining video emergency calls for changes in video emergency call quality or field-of-view or changes in call taker context that would change the identification of which incoming video emergency call is preferred. Accordingly, the electronic computing device configured in the manner set forth herein provides a solution to the problem that a human cannot possibly monitor the number of video emergency calls expected to be provided in the near future to public safety answering points, and provides a unique mechanism for identifying only a highest relevant video call with regard to a specific incident type, to a call taker but continues to monitor remaining video emergency calls (alone or together with the primary video call being provided to the call taker assigned to the incident) to determine if any change, perhaps detectable to a human eye or not, would cause a change in video emergency call priority, and ensure that such a change is reflected in the primary video emergency call being provided to the call taker for the incident. Furthermore, and advantageously, by monitoring continued call record data and incident record data being generated, and/or radio or landline or cellular call traffic with which the call taker is involved, can suggest or directly provide a more relevant one of the active/available plurality of video emergency calls relating to the incident that can best answer or address a question raised in the record or aid a call taker in providing or monitoring execution of a provided instruction by the call taker, among many other advantages set forth herein, including a reduction in the amount of processing power, bandwidth, and storage required at each workstation at a public safety answering point.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or received electronic messages, video, audio, etc., and cannot simultaneously process and compare multiple video streams simultaneously, among other features and functions set forth herein).

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for managing a plurality of incoming video calls at a command center relative to an incident, the system comprising:
   an electronic computing device including an electronic processor configured to:
      receive a first video emergency call from a first recording and transmitting device reflecting a first incident at a first location;
      receive a second video emergency call from a second recording and transmitting device reflecting the first incident at the first location;
      identify the second video emergency call as a preferred one of the first and second video emergency calls based on a quality between the first and second video emergency calls; and
      responsive to identifying the second video emergency call as the preferred one of the first and second video emergency calls, one of:
         cause the identified second video emergency call to be forwarded to a first live call taker at a call taking position and cause the first video emergency call to be forwarded to a video emergency call monitoring bot configured to continue to monitor video content of the first emergency call and refrain from forwarding the first video emergency call to the first live call taker; and
         cause the identified second video emergency call to be forwarded to the first live call taker at the call taking position at a first higher relative resolution and cause the first video emergency call to be forwarded to a video emergency call monitoring bot configured to continue to monitor video content of the first emergency call and cause the identified first video emergency call to be forwarded to the first live call taker at the call taking position at a second lower relative resolution.

2. The system of claim 1, the electronic processor further configured to, responsive to identifying the second video emergency call as the preferred one of the first and second video emergency calls:
  cause the identified second video emergency call to be forwarded to the first live call taker at the call taking position and cause the first video emergency call to be forwarded to the video emergency call monitoring bot configured to continue to monitor video content of the first emergency call and refrain from forwarding the first video emergency call to the first live call taker.

3. The system of claim 1, the electronic processor further configured to, responsive to identifying the second video emergency call as the preferred one of the first and second video emergency calls:
  cause the identified second video emergency call to be forwarded to the first live call taker at the call taking position at the first higher resolution and cause the first video emergency call to be forwarded to a video emergency call monitoring bot configured to continue to monitor video content of the first emergency call and cause the identified first video emergency call to be forwarded to the first live call taker at the call taking position at the second lower relative resolution.

4. The system of claim 1, the electronic processor further configured to:
  receive a third video emergency call from a third recording and transmitting device reflecting the first incident at the first location;
  identify the second video emergency call as a preferred one of the first, second, and third video emergency call based on one or both of a quality and a field-of-view between the first, second, and third video emergency calls; and
  responsive to identifying the second video emergency call as the preferred one of the first, second, and third video emergency calls, one of:
    cause the identified second video emergency call to be forwarded to the first live call taker at the call taking position and cause the first and third video emergency calls to be forwarded to the video emergency call monitoring bot configured to continue to monitor video content of the first and third emergency calls and refrain from forwarding the first and third video emergency calls to the first live call taker; and
    cause the identified second video emergency call to be forwarded to the first live call taker at the call taking position at the first higher resolution and cause the first and third video emergency calls to be forwarded to the video emergency call monitoring bot configured to continue to monitor video content of the first and third emergency calls and cause the identified first and third video emergency calls to be forwarded to the first live call taker at the call taking position at the second lower relative resolution.

5. The system of claim 4, the electronic processor further configured to:
  detect a first question regarding the first incident raised at or by the first live call taker at the first call taking position;
  determine, based on video content of the first and third video emergency calls, that the first question can be better answered by one of a user of the first recording and transmitting device and the first recording and transmitting device rather than one of a user of the second recording and transmitting device and the first recording and transmitting device, and responsively subsequently provide the first video emergency call to the first live call taker in place of the second video emergency call, and subsequently one of offload the second video emergency call to the video emergency call monitoring bot in place of being provided to the first live call taker and offload the second video emergency call to the video emergency call monitoring bot and cause the second video emergency call to be forwarded to the first live call taker at the call taking position at the second lower relative resolution.

6. The system of claim 4, the electronic processor further configured to:
  detect a first question regarding the first incident raised at or by the first live call taker at the first call taking position;
  determine, based on video content of the first, second, and third video emergency calls, that the first question can be better answered by one of a user of the first recording and transmitting device and the first recording and transmitting device, and responsively subsequently provide a first message request reflecting the first question to the first recording and transmitting device; and
  receive, from the first recording and transmitting device, a response to the first message request.

7. The system of claim 6, the electronic processor further configured to:
  one of populate a record accessible to the first live call taker with the received response and cause the response to be provided to the first live call taker at the first call taking position via an audio or visual output device.

8. The system of claim 6, the electronic processor further configured to:
  cause a prompt to be provided to the first live call taker at the first call taking position, accompanying the response, to cause the first video emergency call to be provided to the first live call taker and one of offload the second video emergency call to the video emergency call monitoring bot in place of being provided to the first live call taker and offload the second video emergency call to the video emergency call monitoring bot and cause the second video emergency call to be forwarded to the first live call taker at the call taking position at the second lower relative resolution.

9. The system of claim 4, the electronic processor further configured to:
  detect a first instruction issued by the first live call taker to a responder at the incident;
  determine, based on video content of the first and third video emergency calls, that the first instruction can be better monitored by one of a user of the first recording and transmitting device and the first recording and transmitting device rather than one of a user of the second recording and transmitting device and the second recording and transmitting device, and responsively subsequently provide the first video emergency call to the first live call taker in place of the second video emergency call, and subsequently one of offload the second video emergency call to the video emergency call monitoring bot in place of being provided to the first live call taker and offload the second video emergency call to the video emergency call monitoring bot and cause the second video emergency call to be forwarded to the first live call taker at the call taking position at the second lower relative resolution.

10. The system of claim 4, the electronic processor further configured to:
- detect a first instruction of an action to be taken by the first live call taker or to be issued by the first live call taker to one of a user of the first recording and transmitting device and the first recording and transmitting device, user of the second recording and transmitting device and the first recording and transmitting device, and a user of the third recording and transmitting device and the first recording and transmitting device;
- determine, based on video content of the first, second, and third video emergency calls, that the first instruction can be better executed by one of the user of the first recording and transmitting device and the first recording and transmitting device, and responsively subsequently provide a first message request reflecting the first instruction to the first recording and transmitting device; and
- receive, from the first recording and transmitting device, a response to the first message request.

11. The system of claim 10, the electronic processor further configured to:
- cause a prompt to be provided to the first live call taker at the first call taking position, accompanying the response, to cause the first video emergency call to be provided to the first live call taker and one of offload the second video emergency call to the video emergency call monitoring bot in place of being provided to the first live call taker and offload the second video emergency call to the video emergency call monitoring bot and cause the second video emergency call to be forwarded to the first live call taker at the call taking position at the second lower relative resolution.

12. The system of claim 1, the electronic processor further configured to:
- initially receive the first video emergency call and provide the first video emergency call to the first live call taker, subsequently receive the second video emergency call and subsequently provide the second video emergency call to the first live call taker in place of the first video emergency call, and subsequently one of offload the first video emergency call to the video emergency call monitoring bot in place of being provided to the first live call taker and offload the first video emergency call to the video emergency call monitoring bot and cause the first video emergency call to be forwarded to the first live call taker at the call taking position at the second lower relative resolution.

13. The system of claim 1, the electronic processor further configured to:
- receive an indication from the video emergency call monitoring bot that a change in one of the quality and field-of-view of the first video emergency call has caused a priority associated with the first video emergency call to change;
- newly identify the first video emergency call as the preferred one of the first and second video emergency calls, and responsively one of:
  - cause the identified first video emergency call to be forwarded to the first live call taker at the call taking position and cause the second video emergency call to be forwarded to the video emergency call monitoring bot configured to continue to monitor video content of the second emergency call and refrain from forwarding the second video emergency call to the first live call taker; and
  - cause the identified first video emergency call to be forwarded to the first live call taker at the call taking position at the first higher resolution and cause the second video emergency call to be forwarded to the video emergency call monitoring bot configured to continue to monitor video content of the second emergency call and cause the identified second video emergency call to be forwarded to the first live call taker at the call taking position at the second lower relative resolution.

14. The system of claim 13, wherein the change in the one of the quality and field-of-view of the first video emergency call is a change in field-of-view from a relatively narrow view of the incident to a relative broader view of the incident.

15. The system of claim 13, wherein the change in the one of the quality and field-of-view of the first video emergency call is a change in field-of-view from a relatively smaller number of incident related objects to a relatively larger number of incident related objects.

16. The system of claim 13, wherein the change in the one of the quality and field-of-view of the first video emergency call is a change in field-of-view from a relatively low priority incident related object to a relatively higher priority incident related object.

17. The system of claim 1, the electronic processor further configured to, responsive to identifying the second video emergency call as the preferred one of the first and second video emergency calls:
- transmit one of an audio and visual message in the first video emergency call to one of a user of the first recording and transmitting device and the first recording and transmitting device requesting that the first recording and transmitting device continue providing video content in the first video emergency call for further monitoring by the video emergency call monitoring bot.

18. The system of claim 1, the electronic processor further configured to:
- cause the identified second video emergency call to be forwarded to the first live call taker at the call taking position and cause the first video emergency call to be forwarded to a video emergency call monitoring bot configured to continue to monitor video content of the first emergency call and refrain from forwarding the first video emergency call to any live call taker.

19. A method for managing a plurality of incoming video calls at a command center relative to an incident, the method comprising:
- receiving, at an electronic computing device, a first video emergency call from a first recording and transmitting device reflecting a first incident at a first location;
- receiving, at the electronic computing device, a second video emergency call from a second recording and transmitting device reflecting the first incident at the first location;
- identifying, by the electronic computing device, the second video emergency call as a preferred one of the first and second video emergency calls based on a quality between the first and second video emergency calls; and
- responsive to identifying the second video emergency call as the preferred one of the first and second video emergency calls, one of:
  - cause, by the electronic computing device, the identified second video emergency call to be forwarded to a first live call taker at a call taking position and cause the first video emergency call to be forwarded to a video emergency call monitoring bot configured to continue to monitor video content of the first emergency call and refrain from forwarding the first video emergency call to the first live call taker; and cause, by the electronic computing device, the identified second video emergency call to be forwarded to the first live call taker at the call taking position at a first higher relative resolution and cause the first video emergency call to be forwarded to a video emergency call monitoring bot configured to continue to monitor video content of the first emergency call and cause the identified first video emergency call to be forwarded to the first live call taker at the call taking position at a second lower relative resolution.

* * * * *